United States Patent [19]

Urwin

[11] 4,128,038

[45] Dec. 5, 1978

[54] ROTARY DRIVE FASTENER

[75] Inventor: Peter T. Urwin, Fergus, Canada

[73] Assignee: Pay Television Corporation, New York, N.Y.

[21] Appl. No.: 854,351

[22] Filed: Nov. 23, 1977

[51] Int. Cl.² .......................................... F16B 23/00
[52] U.S. Cl. ....................................... 85/45; 145/50 A
[58] Field of Search ............. 85/45; 145/50 A; 81/71, 81/90 C

[56] References Cited

U.S. PATENT DOCUMENTS

| Re. 22,681 | 10/1945 | Bugg | 85/45 |
|---|---|---|---|
| 1,300,275 | 4/1919 | Johnson | 145/50 A X |
| 2,244,046 | 6/1941 | Bradshaw | 85/45 |
| 3,302,672 | 2/1967 | Walton | 85/45 X |
| 3,369,441 | 2/1968 | Kosar | 85/45 |
| 3,874,258 | 4/1975 | Semowa et al. | 85/45 X |

FOREIGN PATENT DOCUMENTS

| 954633 | 6/1949 | France | 85/45 |
|---|---|---|---|
| 12226 | 8/1896 | Switzerland | 85/45 |
| 255528 | 1/1949 | Switzerland | 85/45 |
| 659432 | 10/1951 | United Kingdom | 81/71 |

Primary Examiner—Thomas J. Holko
Attorney, Agent, or Firm—J. Gibson Semmes

[57] ABSTRACT

A rotatable fastener of low torque application, the fastener being characterized by external fastener, bearing surface which comprises a hemispherical dome, said dome defining a head whereby a mating tool may apply torsional forces thereto, the fastener having formation in the dome of a blind cavity the horizontal cross-section of which appears to be concentric to the center axis of the fastener, an axis of the cavity being at an acute angle relative to the central axis of the fastening means, wherein the driving moment between the fastener and a tool is provided by the eccentric relationship of the cavity, relative to the exterior dome of the fastener.

2 Claims, 4 Drawing Figures

ROTARY DRIVE FASTENER

BACKGROUND OF THE INVENTION

Field of the Invention

Whereas the invention is defined with especial reference to fasteners of the screw type, it is apparent that it could be applied to any type of fastener requiring the application of rotational or torque forces thereto to secure the fastener to one or more superposed elements. Most effective in adaptation of the combination would be the utility thereof as a fastener screw and power tool driver therefor; nevertheless, the invention is not to be limited to said application or to the preferred materials, defined hereinafter. The fastener device is especially adapted to insure against normal unfastening or compromise by those seeking access to the means to be fastened.

This invention is related to my copending Patent Application Ser. No. 697,950 entitled ROTARY DRIVE FASTENER, filed June 21, 1976 now abandoned.

DESCRIPTION OF THE PRIOR ART

The best known prior art includes the following distinguishable patented art: British Pat. No. 1,125,930 dated Sept. 5, 1968 French Pat. No. 1,170,555, dated Jan. 15, 1959 U.S. Pat. Nos.: RE 22,681 Bugg, 2,362,999 Hewitt, 673,056 Jacobs, 3,213,719 Kloack, 1,298,398 Purple, 3,369,441 Kosar, 1,300,275 Johnson, 3,463,209 Podolsky, 2,338,023 Bugg, 3,730,048 Okada.

Among the distinctions and objectives of the present invention, the combination fastener and tool provide: (a) means for self-engagement of tool to fastener when the former is roughly centered and rotated; (b) safety for power driven tools as no points or blades are exposed; (c) fastening securely by the application of relatively low torque as removal of the fastener with standard vise grip pliers or standard tools is impossible; (d) means for the production of secure fastener and tool therefor composed of plastic which due to the need for low torque fastening may be adapted to bind composites at least one of which comprises a fragile material; (e) means for fastening without concern for marring the materials to be fastened.

These and other distinctions will be more readily apparent from reference to the ensuing description and drawings, wherein:

DESCRIPTION OF THE PREFERRED EMBODIMENTS

Figure 1:
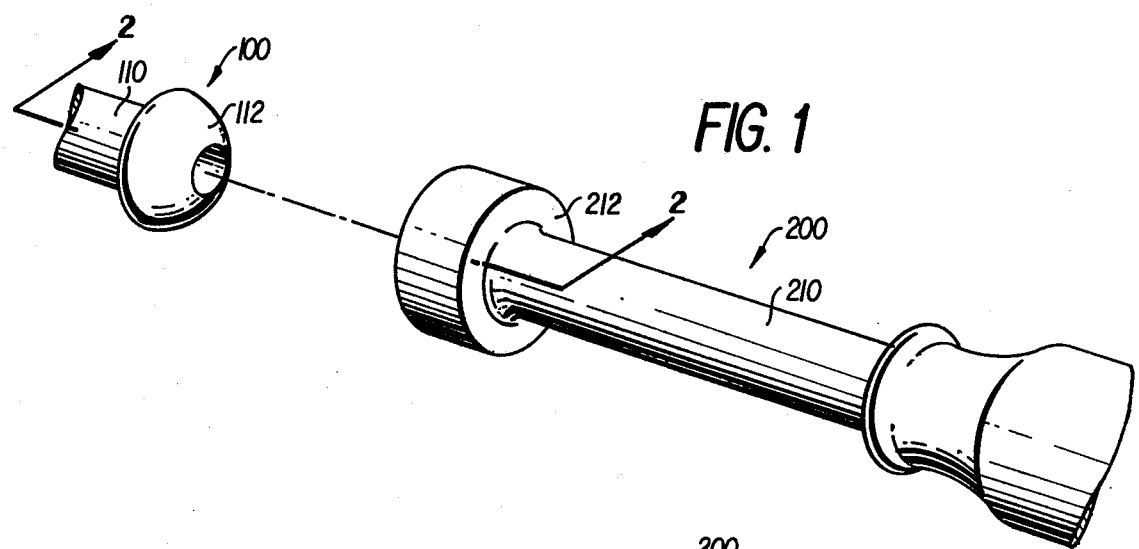
FIG. 1 is a view in perspective showing fastener of invention and associated tool.
Figure 2:
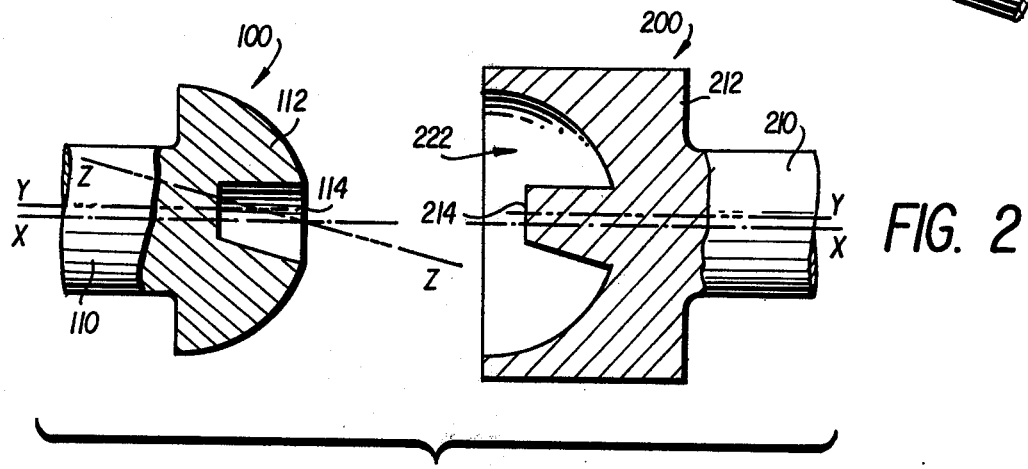
FIG. 2 is a partial vertical sectional view thereof taken along the lines 2—2 of FIG. 1.

The off-center fastener 100, shown in FIG. 1, is preferably fabricated of high carbon steel. The fastener includes a shank 110 which may be adapted to detent pins or threaded bolts screws and the like, depending upon the type of rotary fastening means desired. The shank 110 terminates at a head end 112 to form a hemispherical dome, which defines a peripheral, exterior tool bearing surface. An asymetric blind cavity 114 is disposed therein at a position which is apparently aligned with the center axis "X" of the fastener shank. The asymetric configuration is such as to provide for mating of the tool 200 to the fastener head, by means of a mating pin in the tool, said pin corresponding on configuration to the recess or cavity in the head. The tool also engages the outer perimeter of the fastener head by its cylindrical inner wall, hereinafter described.

Figure 4:
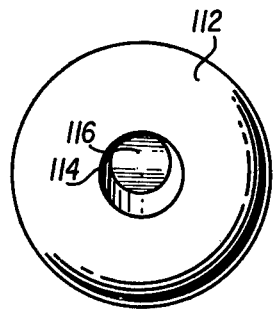
FIG. 4 is a top plan view of the fastener.

The cavity 114 of the fastener comprises a bore having two axes "Y" and "Z", as shown. Accordingly, the cavity comprises two portions interconnecting the open outer end and the closed inner end 116 thereof. One portion of the cavity 114 is generated about axis "Y" which is parallel to the shank axis "X" of the fastener. The second portion of the cavity 114 is generated about axis "Z" which is at an acute angle with respect to the shank axis "X". This yields in configuration a circular open top to the cavity and a circular closed bottom which is offset, reference FIG. 4. The center axis of the shaft and the "Z" axis of the cavity, thus intersect at a point which is at the top of the cavity and head of the fastener, thus permitting the insertion of a tool counterpart to effect torsional drive, by impingement of the tool surfaces upon the inclined slope of the cavity, simultaneously as the tool engages the outer head of the fastener. The driving moment that may be applied to the fastener is thus made available by the eccentric relationship of the tapered cavity, relative to the exterior of the dome of the fastener, the two providing a secure seat for a driving tool.

The tool 200 may comprise any convenient rotary or torsional driver having shank 210 and handle or power tool adaptor, the working end 212 which may be of any suitable exterior configuration, commensurate with available working environment. The tool head interior, however, comprises a "negative" in part of the corresponding fastener head. Pin 214 is thus adapted to close tolerance, friction fit with the tapered cavity 114 of the fastener, and likewise has its axis offset from the center axis of tool 200, leaving the concentric cavity 222 to seat upon the corresponding surface 112 of the fastener. See FIG. 3.

Figure 3:
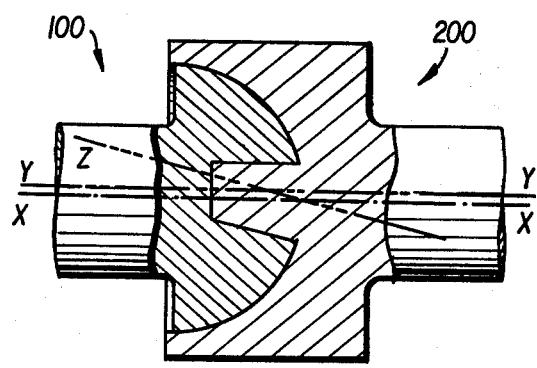
FIG. 3 is a partial vertical sectional view showing coaction between the fastener and applied tool.

Referring to operational characteristics of invention, FIG. 3, if the fastener and tool alignment is perfect, upon application of a tool 200 all of the force will be applied tangential to a circle drawn from the center axis of the fastener head 112 and a radius equal to a circle measured from the fastener axis to the point of contact of the fastener with the outer extremity recess 222 of the tool.

Whereas the invention has been defined with reference to bolts, screws and related fasteners having a unitary shank and head, clearly the invention is equally adapted to fasteners having fastening means which are extension of the head or contained therein.

I claim:

1. Rotary drive fastener providing integral construction which is preclusive of compromise, comprising:
   (A) fastening means having a central axis at extremes of which are driving and driven ends;
   (B) a driver engageable head on the driving end of the fastening means, said head having its central axis aligned with the central axis of the fastening means, the head in exterior configuration, forming a hemispherical dome;
   (B1) a tapered asymetric cavity located generally centrally within the dome of the head, said cavity defining a circular open outer end and a circular closed inner end, the inner end being of smaller dimension than the outer end, the center of the open outer end being coaxial with the central axis of the head and the center of the closed inner end being offset therefrom, the respective ends of the cavity being concentric to each other, said asymetric cavity comprising two portions interconnecting the open outer end and the closed inner end, one portion of the cavity being generated about a first axis which is parallel to said central axis and a second portion of the cavity being generated about a second axis which is at an acute angle relative to the central axis of the head and fastening means, the respective second axis of the cavity and central axis of the head and fastener intersecting at the top of the head whereby the cavity in said dome provides means for the engagement of a corresponding tool having a recessed head for the application of torsional force to the fastener, said fastener being, by reason of the positioning of the axis described above, subject to captivation, the bottom portion of the cavity serving as a repository for the transfer of torque from the driver tool by means of a driving pin.

2. The rotary drive fastener of claim 1 wherein the cavity comprises a tapered, blind recess which in vertical section has a first wall corresponding to said first portion which is parallel to the fastener axis and an opposed second wall corresponding to said second portion which is at an acute angle to the fastener axis.

* * * * *